Aug. 25, 1970 L. E. MUELLER 3,525,484

AERODYNAMIC SAUCER

Filed June 17, 1968

INVENTOR.
LEONARD. E MUELLER

BY Carl R. Brouse

ATTORNEY

_United States Patent Office_

3,525,484
Patented Aug. 25, 1970

1

3,525,484
AERODYNAMIC SAUCER
Leonard E. Mueller, 4557 Mount Hubbard Ave.,
San Diego, Calif. 92117
Continuation-in-part of application Ser. No. 523,838,
Jan. 18, 1966. This application June 17, 1968, Ser. No.
737,456
Int. Cl. B24c 29/00
U.S. Cl. 244—12                        3 Claims

ABSTRACT OF THE DISCLOSURE

A low density circular aerodynamic saucer having a duct opening in the center with a propeller means therein for rotating in a single plane, thereby inducing air flow through the duct and causing the saucer shaped wing to rotate in one direction and the propeller to rotate in another direction relative to ground, the combination of which provides stable flight.

BACKGROUND OF THE INVENTION

The present application is a continuation-in-part of patent application Ser. No. 523,838, filed Jan. 18, 1966, now abandoned. The embodiment of this invention comprises a saucer shaped rotating wing structure having a central cylindrical duct that houses an engine that turns a fan or propeller in a single plane. The duct and propeller controls air flow across the inner portion of the wing and provides counter rotation of the saucer shaped wing. The rotation of the wing increases lift from air flow at the outer circular edge of the wing.

The flying craft differs from the helicopter in that the thrust force is produced by a fan or propeller and by air flow over the surface of a rotating saucer shaped wing structure. The helicopter uses the rotation of large blades to obtain lift. In the event of engine stoppage, the saucer shaped wing acts as a rotating parachute while the helicopter uses autorotation of its rotor blades to achieve safe descent. There have been many air vehicles that have used disk or saucer shaped structures. The Princeton Laboratory Air Scooter and the X3 Ground Effects machines, the Cushion Craft built by Britten Norman Ltd. of England, the Coanda Saucers, and the Avro VTOL Vehicle built by Avro Aircraft Ltd. in Canada are some well known examples. However, none of these devices use rotation of the saucer or circular wing structure in counter rotation to a central rotating propeller means to produce lift and gyroscopic stability.

Thus it would be advantageous to have a new and improved aerodynamic saucer that is capable of effective and improved flight.

SUMMARY OF THE INVENTION

In an embodiment of the aerodynamic saucer of this invention, a circular wing has a central opening therethrough with a cylindrical duct member secured in the opening and with a single plane, downwardly thrusting propeller means, positioned in the duct for inducing air flow over the adjacent upper surface of the wing and through the duct. The circular wing has an air foil shape in the radial cross section between the central opening and the outer periphery of the wing with the leading edge of the air foil section being adjacent the opening. The single plane rotating propeller means provides a counter force that rotates the wing in a circular direction opposite to the rotation of the propeller means. This rotation of the wing and its shape increases lift by increasing movement of air outwardly over the outer surface of the wing. The outer edge of the wing has a Coanda air flow that is augmented by the rotation of the wing. The lower portion of the wing is hollow and open in a downward direction. This lightens the overall wing structure and also provides for lift producing air flow underneath the lower surface of the wing.

During development of this aerodynamic saucer, several methods for producing satisfactory lift with power on and with power off were tried. These included vanes placed in the central duct, vanes placed along the edge of the saucer, vents in the saucer surface, and louvers in the saucer surface. It was found however, that the embodiment of the aerodynamic saucer disclosed in this application had improved stability with the saucer rotating without vanes, vents, or louvers.

In the embodiment of the aerodynamic saucer, the engine is secured in the duct. When power is produced by the engine, the torque reaction from the central fan attached to the engine crankshaft rotates the saucer in the opposite direction of fan rotation. Upon engine shut down, air flows through the central duct and reacts with the fan blades and against engine compression. This force continues to rotate the saucer, thus producing power off gyroscopic stability.

Test vehicles were built of metals including high tensile aluminum alloys, cast plastic materials, high impact molded plastic, sheet-vinyls, polystyrene, polyethylene, fiber glass reinforced epoxies and polyurethane formulations. The high impact plastics have proven most satisfactory for the structure. However, any suitable material may be used. More than a dozen test models have been flown successfully to date. These models have been powered with small reciprocating engines and most have been fabricated from vacuum formed plastic sheet.

Thus applicant has provided a new, light weight and inexpensive flying vehicle that may be used as a toy or for other suitable test and flight purposes. The structure may employ a model airplane reciprocating engine to rotate the propeller and may be made of light weight and yet strong material that provides an aerodynamic saucer toy that is capable of very pleasing flight.

It is therefore an object of this invention to provide a new and improved flying structure.

It is another object of this invention to provide a new and improved aerodynamic saucer that may be flown as a toy and that has a low density wing structure that resists impact when striking the ground.

It is another object of this invention to provide a new and improved aerodynaamic saucer structure that has inherent gyroscopic stability through wing rotation in a direction opposite to propeller rotation relative to ground.

Other objects and advantages reside in the detailed construction and operation of this invention, as more fully and hereinafter described, reference being made to the accompanying drawings wherein like reference numerals refer to like parts throughout and in which.

Figure 1:
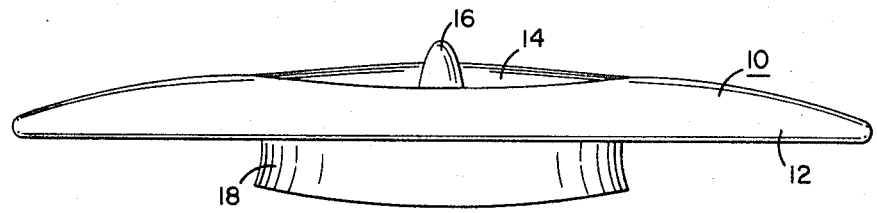
FIG. 1 is a side view partly in prospective of an embodiment of the aerodynamic saucer of this invention.
Figure 2:
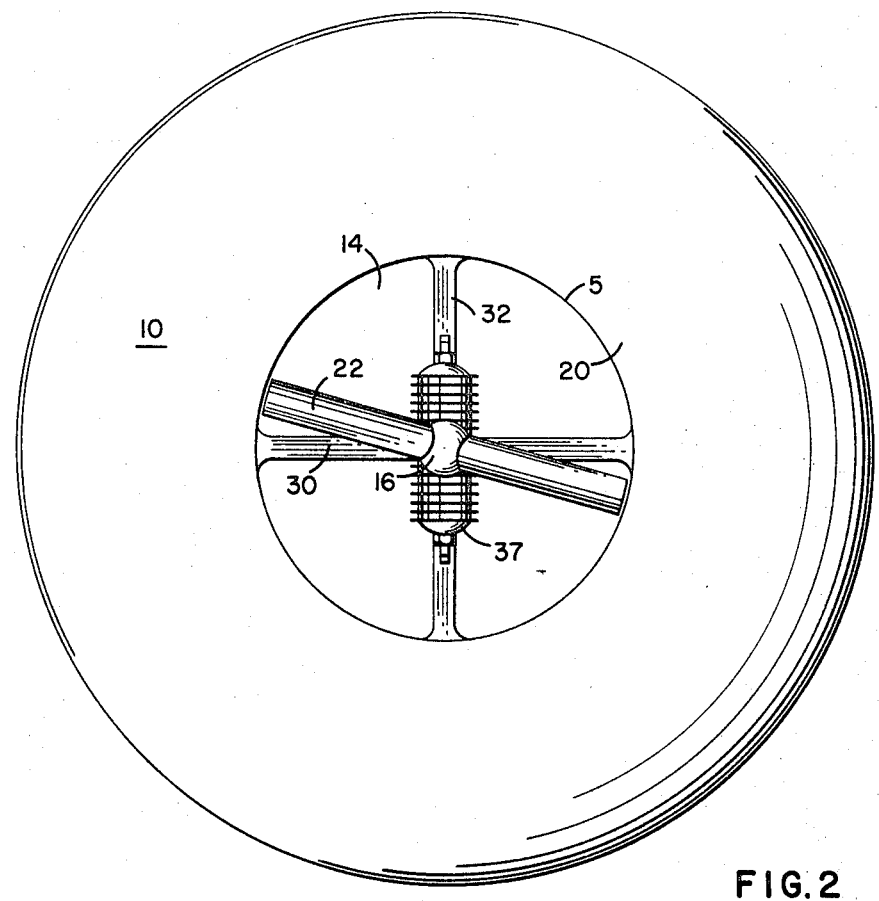
FIG. 2 is a top plan view of the embodiment illustrated in FIG. 1.
Figure 3:
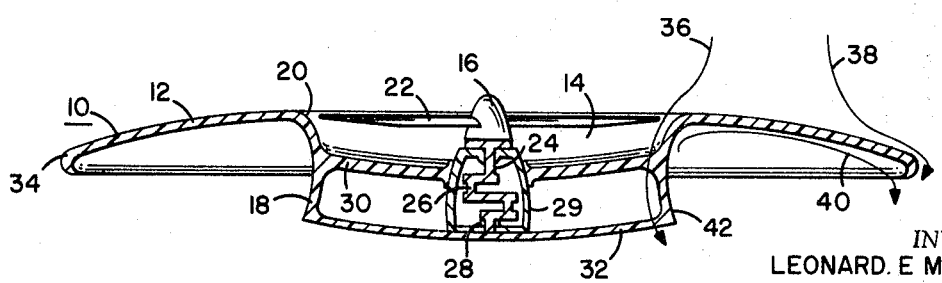
FIG. 3 is a cross sectional view taken along the diameter of the embodiment illustrated in FIG. 1 of the aerodynamic saucer.

Referring now to the drawing, an aerodynamic saucer 10 has a circular wing 12 that in cross section has an upper surface with an air foil shape in the radial cross section, with the leading edge of the air foil section terminating at an opening 14 through the wing structure 10. The opening 14 has a cylindrical duct portion 18 that diverges outwardly at its lower surface 42 and has cross bars 30 and 32 that support engine 37, shaft 24 and housing 29. A propeller means comprising a propeller 22 rotates in a single plane and is connected to the upper end of the drive shaft 24 that is rotated in bearings 28. A propeller cone 16 provides an appropriate aerodynamic shape at the point of securing the propeller 22 to the shaft 24.

The lower surface 42 of the circular wing 12 has a shape that substantially conforms to the air foil shape of the upper surface of the wing 10. The lower surface of the wing 10 is hollow with the outward edge having a downward directed lip portion 34.

In flight, the engine 37 provides reciprocating force to the drive shaft 24, by means of known bearing connections 26, rotating the propeller 22 in a direction that for example may be in a counter clockwise direction. This rotating force of the propeller 22 and the turning force through drive shaft 24 of the engine 37 causes the wing structure 12 to rotate in a clockwise direction. Thus the propeller 22 and the wing 12 rotate in counter rotating directions relative to the ground surface.

In such flight, air currents are induced by the rotating propeller 22 to move over the adjacent upper surface of the wing 12 and downwardly through the hollow duct volume 14 of the duct 18 and to follow the path substantially illustrated by arrow 36. The upward movement of the wing 12 coupled with the rotational movement of the wing 12 relative to static air and ground, causes air to flow in a radially outward direction over the outer portion of the wing in the direction of arrow 38. This creates a Coanda air flow over the tip portion 34 of the wing 12. This air flow creates a reduced air pressure on the upper surface of the wing that induces flight. The rotational movement of the wing relative to air flow increases the amount of outwardly directed air flow over the wing surface and thus increases lift. Induced air currents in the direction of arrow 40 provide a reactive upwardly directed force on the wing structure that further provides lift. The air flow in the direction of arrow 36 through the diverging portion 42 of the duct 18, creates an increased air volume with a decrease in velocity that provides an upwardly directed force on the duct portion 18, that further increases lift.

OPERATION

In operation the engine 37 turns the propeller 22 in a manner that the propeller turns in one direction and the wing 12 turns in the opposite direction. This movement of the propeller 22 and rotational movement of the wing 12 induces lift as previously described that causes the aerodynamic saucer to fly.

Having described my invention, I now claim:

1. An aerodynamic flying saucer comprising,
a saucer shaped circular wing being freely rotatable in flight having a central circular opening therethrough with an airflow duct through said opening,
the radial cross section of the upper surface of said wing between said opening and the outer periphery of said wing having an airfoil shape with the leading edge thereof at said opening,
the lower portion of said wing is hollow and open in the downward direction defining an open lower volume whose upper surface is the lower surface of said wing,
a single downwardly thrusting propeller positioned in a single plane in said duct,
and means for moving air downwardly through said duct and in a radially outward direction over the upper surface of said wing by rotating said propeller in one direction and said wing in the opposite direction, thereby providing aerodynamic lift force to said saucer.

2. An aerodynamic flying saucer as claimed in claim 1 in which the outer edge of said wing is curved downwardly.

3. An aerodynamic saucer as claimed in claim 2 in which said rotational movement of said wing in flight, inducing airflow downwardly and outwardly over the outer edge of said wing.

References Cited

UNITED STATES PATENTS

| | | | |
|---|---|---|---|
| 2,843,339 | 7/1958 | Streib | 244—12 |
| 2,990,137 | 6/1961 | Willis | 244—12 |
| 3,034,747 | 5/1962 | Lent | 244—23 |
| 3,276,723 | 10/1966 | Miller et al. | 244—12 |

FOREIGN PATENTS 678,700   1/1964   Canada.

TRYGVE M. BLIX, Primary Examiner

J. E. PITTENGER, Assistant Examiner